Oct. 18, 1966   R. KAROL   3,279,445
ROTARY PISTON ENGINE
Filed June 15, 1964   6 Sheets-Sheet 1
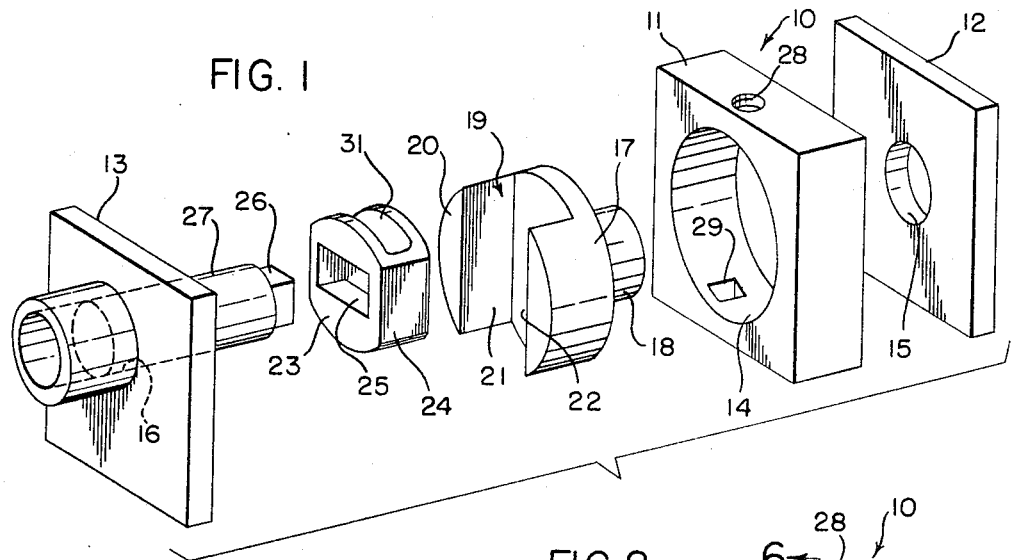
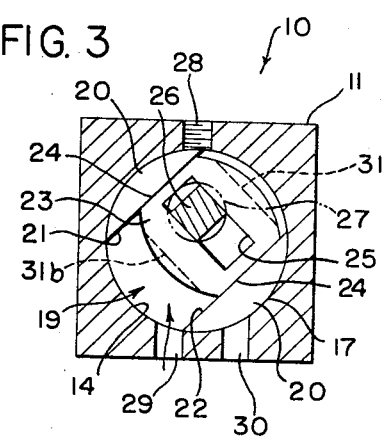
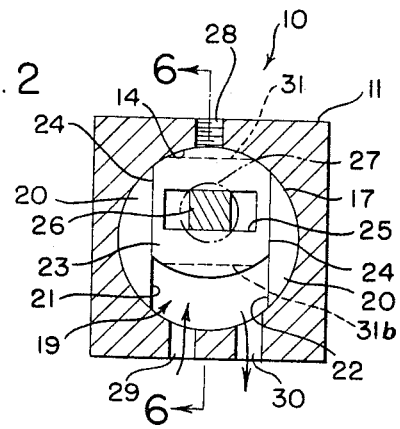
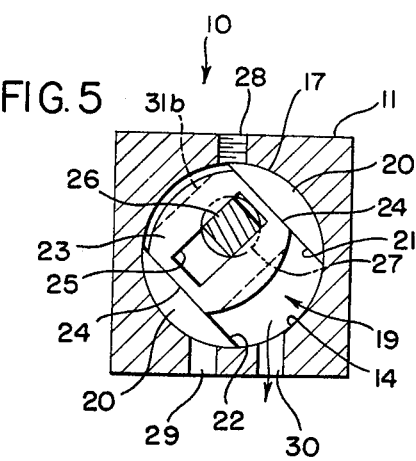
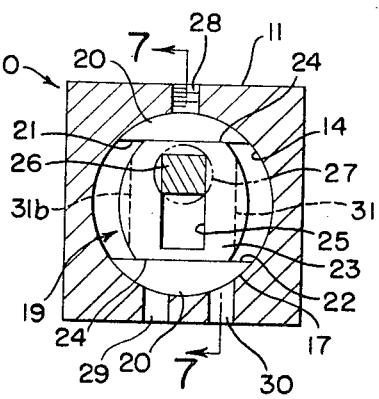
INVENTOR.
ROBERT KAROL
BY
*Fay & Fay*
ATTORNEYS Oct. 18, 1966  R. KAROL  3,279,445
ROTARY PISTON ENGINE
Filed June 15, 1964  6 Sheets-Sheet 2

INVENTOR.
ROBERT KAROL
BY
Fay & Fay
ATTORNEYS

Oct. 18, 1966 R. KAROL 3,279,445
ROTARY PISTON ENGINE
Filed June 15, 1964 6 Sheets-Sheet 3

INVENTOR.
ROBERT KAROL
BY
*Fay & Fay*
ATTORNEYS

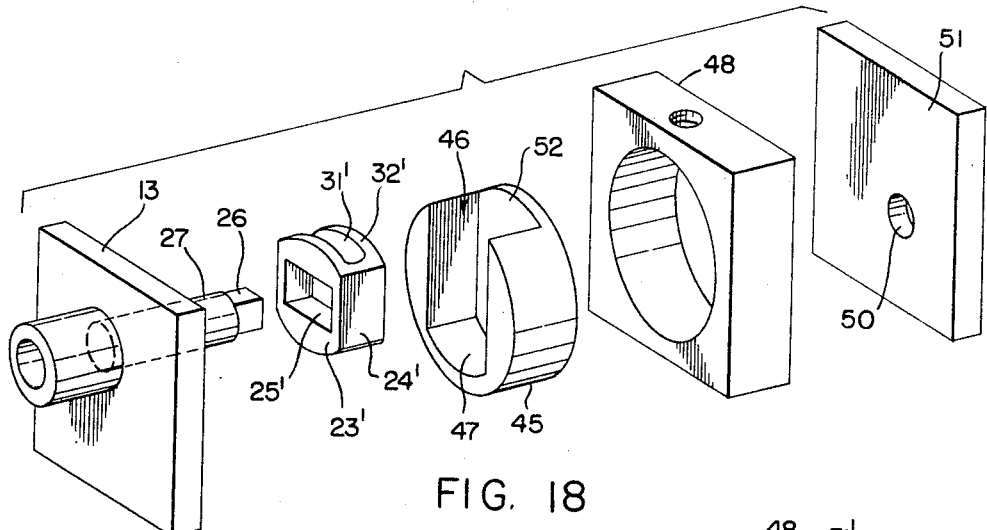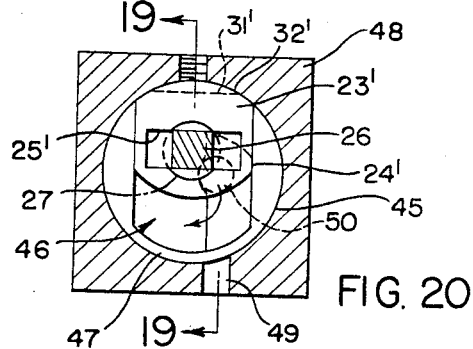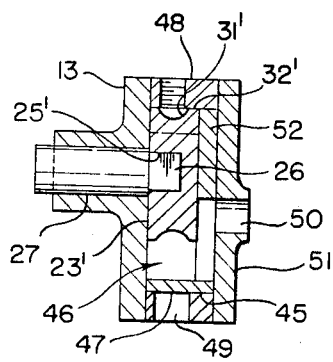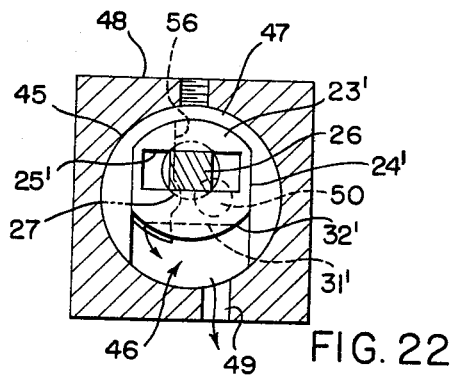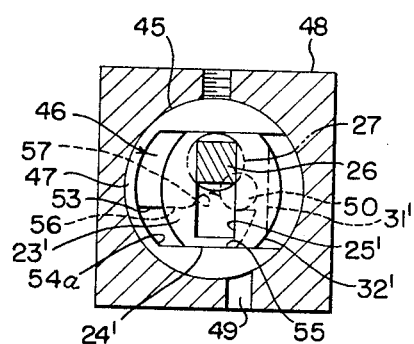

Oct. 18, 1966 R. KAROL 3,279,445
ROTARY PISTON ENGINE
Filed June 15, 1964 6 Sheets-Sheet 5
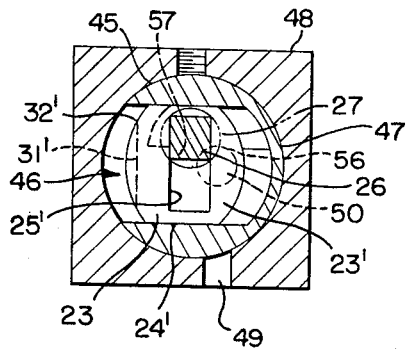
FIG. 23
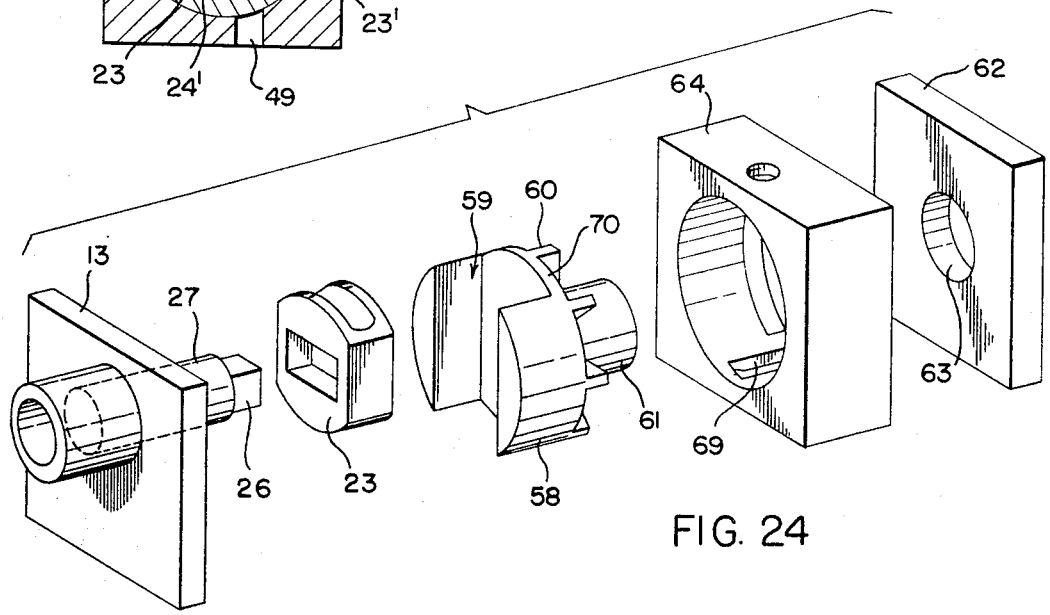
FIG. 24
FIG. 26
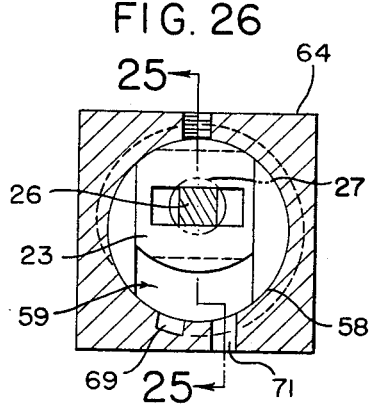
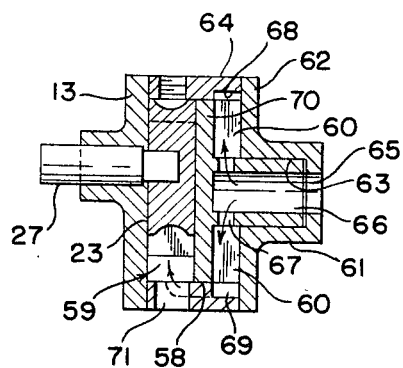
FIG. 25
INVENTOR.
ROBERT KAROL
BY
*Fay & Fay*
ATTORNEYS Oct. 18, 1966 R. KAROL 3,279,445
ROTARY PISTON ENGINE
Filed June 15, 1964 6 Sheets-Sheet 6

INVENTOR.
ROBERT KAROL
BY
*Fay & Fay*
ATTORNEYS

United States Patent Office 3,279,445
Patented Oct. 18, 1966

3,279,445
ROTARY PISTON ENGINE
Robert Karol, 17530 Lakeshore Blvd., Cleveland, Ohio
Filed June 15, 1964, Ser. No. 375,067
16 Claims. (Cl. 123—44)

This invention relates to a rotary piston internal combustion engine.

Throughout the years, continuing attempts have been made to replace the conventional piston type, internal combustion engine with an alternative type of power plant. One area in which considerable efforts have been expended is in the area of rotary piston engines. The result has been a great diversity of designs of rotary piston engines, with only the so-called Wankel engine having any degree of commercial acceptance. However, efforts have continued due to several desirable qualities which are apparently attainable in a rotary piston engine. Thus, the rotary piston engine eliminates the crank shaft, the connecting rods, and other ancillary equipment which is necessary in the conventional piston type of engine. A rotary piston engine is capable of a very simple design, more compact than conventional engines and holds out the possibility of a higher level of horsepower delivered per pound of engine.

Despite these several theoretically advantageous features, to name but a few, there are no rotary piston engines which have gained wide acceptance. Several reasons are apparent for this lack of acceptance with one of the major reasons being the sealing problems which have been present in the rotary piston engines designed so far. Other problems have also been encountered; however, an exhaustive detailing of these problems is believed to be unnecessary.

It is an object of the present invention to provide a rotary piston engine.

Another object of the invention is to provide a rotary piston engine which obviates much of the sealing problems heretofore experienced in such engines.

Another object of the invention is to provide a rotary piston engine which has no actual reciprocating parts nor internal synchronizing gears.

It is another object of the invention to provide an engine of the rotary piston type which includes a housing with a rotatable cylinder and wherein the ignition element, the induction ports and the transfer and exhaust ports are located in the internal periphery of the cylinder housing whereby the rotation of the cylinder effects the necessary timing and valving functions.

Still a further object of the invention is to provide an improved housing, cylinder, piston and crankshaft arrangement for a rotary piston engine.

A more specific object of the invention is to provide novel scavenging and induction arrangements for a rotary piston engine.

A still more specific object is the provision of means in combination with a rotary piston engine adapted to effect induction and compression of the fresh charge of fuel and air and transfer such charge under pressure to the combustion chamber.

The above objects, as well as others, are accomplished by a housing in which a cylinder is rotatably mounted. A slot is provided in the cylinder with the walls of the slot cooperating with ports in the housing to control the induction of fuel and air and the exhaust of combustion products. A piston is received in the slot in the cylinder with a shaft having a crank pin secured to the piston. The rotational axis of the shaft is offset from the rotational axis of the cylinder with a slot in the piston receiving the crank pin thereby permitting the piston to assume a position eccentric to the shaft as the cylinder rotates.

The principles of the invention further contemplate, in addition to the above described combination of elements, the addition of secondary means adapted to compress a fresh charge of fuel and air and transfer this charge, under pressure, to the combustion chamber formed by the slotted cylinder and piston.

To the accomplishment of the foregoing and related ends, the following description sets forth in detail but a few approved means for carrying out the invention. Such disclosed means are not meant to be limiting inasmuch as they constitute but a few of the various ways in which the principles of the invention may be applied. Other objects, features and advantages of the present invention will become more apparent upon a complete reading of the description in connection with the accompanying drawings.

In the drawings wherein like reference numerals indicate like parts in the various views:

FIG. 1 is an exploded perspective view of one schematic embodiment of the rotary piston engine;

FIG. 2 is a sectional view of the embodiment of FIG. 1 showing the engine with the piston in top dead center;

FIG. 3 is a view similar to FIG. 2 with the piston in the power stroke;

FIG. 4 is a view similar to FIG. 2 showing a continuation of the power stroke and the compression of a fresh charge of fuel and air;

FIG. 5 is a view similar to FIG. 2 showing the exhausting of the combustion residue and the compression of the fresh charge;

FIG. 18 is an exploded perspective view of a further modification of the engine shown in FIG. 1;

FIG. 19 is a view taken along line 19—19 of FIG. 20;

FIGS. 20 through 23 illustrate the relative positions of the parts of the engine during progressive stages of its cycle;

FIG. 24 is an exploded perspective view of another modification of the engine illustrated in FIG. 1;

FIG. 25 is a view taken along line 25—25 of FIG. 26;

FIGS. 26–29 are illustrations of the relative positions of the parts of the engine during progressive stages of its cycle.

Figure 6:
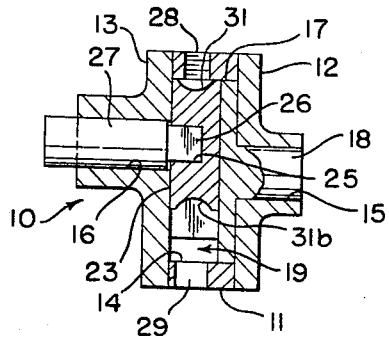
FIG. 6 is a view taken along line 6—6 of FIG. 2.
Figure 7:
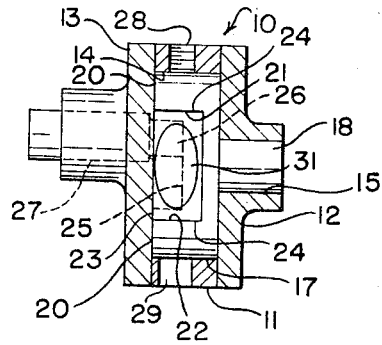
FIG. 7 is a view taken along line 7—7 of FIG. 4.

Turning to FIG. 1, there is illustrated, somewhat schematically, one embodiment of the instant invention. The engine comprises a housing indicated generally by the reference numeral 10. This housing includes a cylinder block 11 and end plates or side plates 12 and 13 which are adapted to be secured to the block. The cylinder block 11 includes a central bore 14. Coaxial with the bore 14 is a smaller bore 15 formed in the end plate 12. A bore 16 similar to the bore 15 is provided in end plate 13 but the axis of the bore 16 is displaced from the common axis of the bores 14 and 15.

A cylinder 17 is rotatably received in the bore 14, with the cylinder including a stub shaft 18 which is received in bore 15 of end plate 12. It is believed to be obvious that appropriate bearing means may be used to mount the shaft 18 in the bore 15 although these bearing means have not been illustrated. It is to be noted, however, that the bearings supporting the shaft 18 will serve to space and accurately align the cylinder 17 in the bore 14 for frictionless rotation relative one to the other.

The cylinder 17 further includes a slot 19 formed in the end face 20 of the cylinder opposite to the stub shaft 18. The slot 19 is defined by spaced apart parallel walls 21, 22 between which there is adapted to be received a piston 23. The piston 23 includes parallel flats or sides 24 which are adapted to fit closely with the parallel walls 21, 22 and thereby provide a closely guided path of movement for the piston relative to the cylinder 17. As is believed apparent, the cooperation between the faces 24 and the walls 21, 22 prevents relative rotation between the piston 23 and the cylinder 17.

A rectangular recess 25 is formed in the central region of the piston 23. Adapted to be slidably received in the recess 25 is a crank pin 26 which cooperates with the walls of the recess to restrain relative rotation between the pin and the piston. The crank pin 26 is carried at the outer extremity of a drive shaft 27 journalled in the bore 16 in end plate 13. Here again, it is to be recognized that the mounting of the shaft 27 in the end plate is purely schematic and appropriate bearing means would be provided to insure the proper mounting of the shaft in the housing.

An appropriate opening 28 is provided in the housing 11 for the insertion of an ignition means such as a spark plug. Generally diametrically opposed to the opening 28 in the housing 11 are a pair of spaced apart ports 29 and 30. The ports 29 and 30 open into the central bore 14 in the cylinder block 11 and are adapted to be connected to appropriate intake and exhaust manifolds details of which are believed to be unnecessary for purposes of this disclosure. It is believed to be sufficient merely to note that the port 29 designates the intake port while port 30 refers to an exhaust port with both ports placed in the cylinder block 11 such that they intersect the path of rotation of the slot 19 in cylinder 17.

The piston 23 includes arcuate surfaces 32 on opposite sides of the piston and which are adapted to mate with the interior peripheral surface of bore 14. Formed in each of the arcuate surfaces is a recess 31. The combination of the surface 32 and the bore 14, when the piston is in a position such as shown in FIG. 2, causes any material in the recess 31 to be effectively trapped until such time as the piston is removed from the surface of the bore.

The operation of the engine is as follows:

Assuming the parts to be in the position shown in FIG. 2, the piston is in a position of top dead center where the combustible mixture of fuel and air has been fully compressed and ignition occurs. As indicated by the arrows in FIG. 2, as ignition occurs, the residue of the previous combustion process is being scavenged through the exhaust port 30 and a fresh charge of combustible fuel and air is entering the chamber defined by the slot 19. Due to the inertia possessed by the rotating cylinder 17 and the piston 23 as the fuel is ignited and expands, the piston and cylinder are rotated to this position illustrated in FIG. 3. It is to be noted that in the position of top dead center, as shown in FIG. 2, the crank pin 26 is disposed centrally of the piston 23 and the piston is in symmetrical alignment with the spark plug. In such a position, with the combustible fuel effectively trapped in the recess 31 in the piston 23, the expansion of the gases theoretically would exert a uniform force against the surface of the piston on opposite sides of the crank pin 26. It is apparent that, theoretically, the equal and opposite expansion forces exerted on the crank pin 26 would prevent the imposition of any turning movement on the shaft 27. However, the inertia possessed by the system is such that the cylinder and piston assume the position shown in FIG. 3. In this position, the piston has assumed an eccentric position relative to the crank pin and, as the expansion of the gases continues, the forces released thereby act over a continually expanding angle with a consequent increase in the lever arm which thereby facilitates the increase in the torque acting on the shaft 27. In conjunction with the expansion of the gases, the rotation of the cylinder 17 causes one wall 22 of the slot in the cylinder to pass over and close the exhaust port 30, as illustrated in FIG. 3. The intake port 29 remains in an open condition so that induction of the fresh charge of fuel and air may be completed.

As shown in FIG. 4, the expansion process on the power stroke has reached a point where the crank pin 26 is at its farthermost point of displacement in the rectangular recess 25 thereby providing the maximum lever arm on which the expanding gases can operate to transmit torque to the shaft 27. Also, as shown in FIG. 4, the intake and exhaust ports have both been closed by the wall 22 of the cylinder 17 and compression of the fresh charge of fuel and air has commenced. In FIG. 5, the cylinder 17 has rotated to a position wherein wall 21 of cylinder 17 has uncovered port 30 and the fully expanded gases are being exhausted through exhaust port 30 while compression of the fresh charge is continuing as the piston nears top dead center once again. The final step in the cycle is illustrated in FIG. 2 wherein the piston has reached top dead center and ignition occurs. It is to be noted that the surface 32 on the piston 23 closely mates with the interior of the bore 14 so that in the top dead center position, the gases which were compressed are now contained in position over the ignition point by the relatively small area defined by recess 31.

Several features are to be emphasized. It is believed apparent that by the construction shown, the serious sealing problems which have heretofore been present in rotary piston engines may easily be overcome. Thus, the sealing of the cylinder 17 in the bore 14 is not a serious problem since it presents a simple rotating motion. Moreover, in view of the mounting of the stub shaft 18 in the housing bore 15, it is apparent that an accurate alignment of the cylinder in the bore may be obtained and thereby substantially decrease the sealing necessary.

It is to be noted that the combustion and scavenging process of the engine illustrated in FIG. 1 follows the basic, well-known, two cycle operation. However, unlike conventional two cycle engines, there are no actual reciprocating parts nor internal synchronizing gears. In fact, very few moving parts are required so that friction is greatly reduced thereby greatly contributing to the reliability and longevity of the engine. Moreover, unlike a conventional two cycle engine, the rotary piston engine here disclosed has two power strokes for each revolution of the shaft 27. Yet despite this increased number of combustion cycles, cooling is not a problem since the products of combustion are not confined to the zone of combustion. Thus, as the gases are ignited and expand, the cylinder rotates to remove the gases from the ignition area with the exhausting of the gases occurring at a point remote from the ignition area. Contrasted with this is the conventional piston engine wherein the gases remain in the same general position throughout the combustion and expansion cycle.

Figure 8:
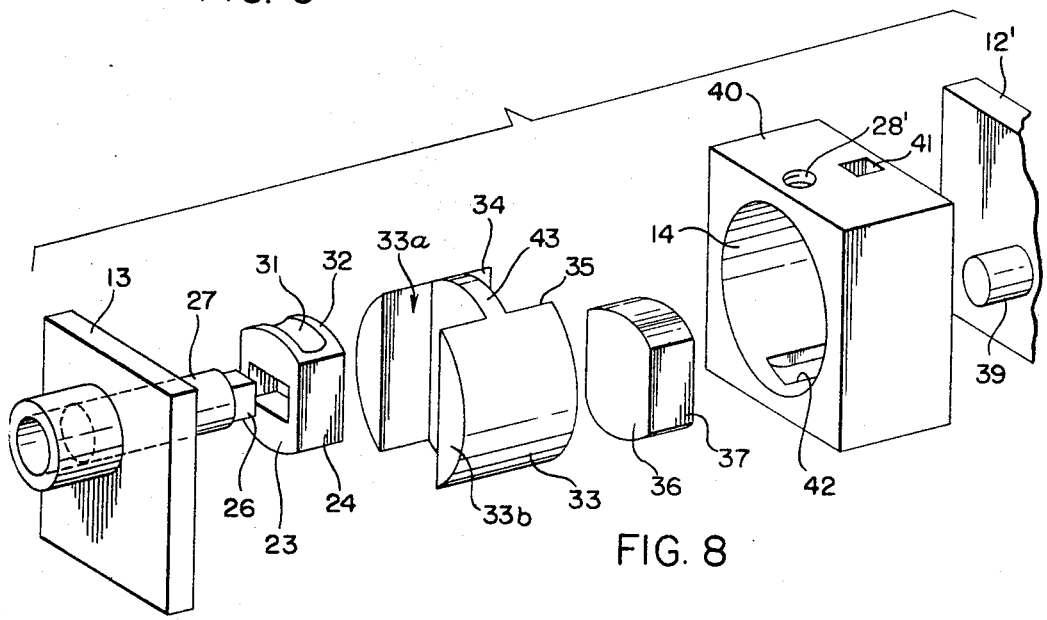
FIG. 8 is an exploded perspective view of a modification of the engine illustrated in FIG. 1.
Figure 9:
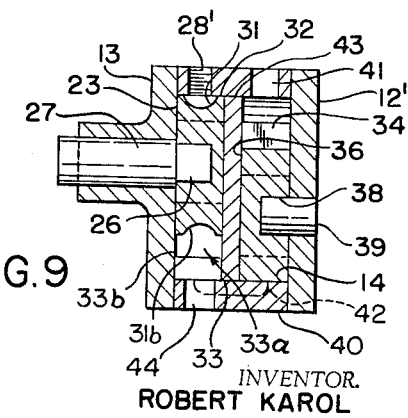
FIG. 9 is a view taken along line 9—9 of FIG. 10.
Figure 11:
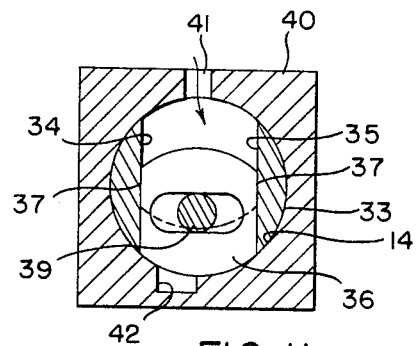

Turning to the embodiment illustrated in FIG. 8, the basic components of the engine are similar to those illustrated in FIG. 1 and like reference numerals are used to indicate like parts. Thus, the shaft 27 and the piston 23 are substantially identical to the corresponding components in FIG. 1. The cylinder 33 in the embodiment of FIG. 8 is somewhat different, however, from that illustrated in FIG. 1. Like that illustrated in FIG. 1, a slot 33a is formed in one face 33b of the cylinder, with the piston 23 being reciprocally received in the slot. On the cylinder face 34 opposite to the face 33b, there is provided a slot 35 which is substantially a mirror image of the slot 33a. Adapted to be received in the slot 35 is a secondary piston 36, which piston, like the piston 23, includes guiding flats 37 adapted to cooperate with the sides of the slot 35 and thereby restrain the piston for purely reciprocating motion relative to the cylinder 33. The piston 36 includes a recess 38 in which there is received a stub shaft 39. The other end of the shaft 39 is journalled in the end plate 12' as illustrated in FIG. 9.

A modified intake and exhaust porting arrangement is provided in the cylinder block 40 with an inlet port 41 being provided in the upper surface of the housing. This induction or inlet port 41 is spaced axially of the spark plug opening 28' and, with the cylinder 33 received in the housing 40, the opening or port 41 is generally aligned with the piston 36 and the slot 35. Inasmuch as the combustion chamber is formed by the slot 33a, it is necessary for the combustible mixture to be transferred from the inlet port 41 to the opposite side of the cylinder 33. The means for accomplishing this purpose is provided in the form of a passage 42 which is formed in the peripheral wall of the cylinder bore 14. The length of the passage 42 is such that it spans or bridges the wall 43 in the cylinder 33 which separates the slot 33a from the slot 35 thereby permitting the transfer of the gases from one side of the wall to the other. Completing the intake and exhaust system is an exhaust port 44 which is diametrically opposed and axially spaced from the inlet port 41 so that it is in the path of rotation of slot 33a and piston 23.

The operation of the rotary engine of FIG. 8 is substantially that described above in connection with FIG. 1 with the differences residing in the method of induction, transfer and scavenging or exhausting of the gases. Thus, the embodiment of FIG. 8 utilizes the secondary piston 36 to effect the induction and compression of a fresh charge of combustible fluid and to transfer this charge, under pressure, to the combustion chamber defined by slot 33a.

Figure 10:
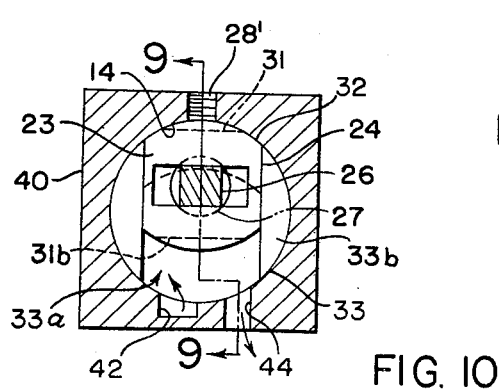
FIGS. 10–17 are views showing the relative positions of the parts of the engine during progressive stages of the cycle.
Figure 12:
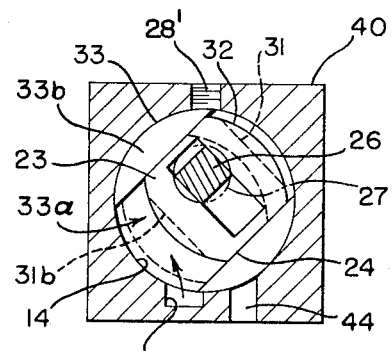
Figure 14:
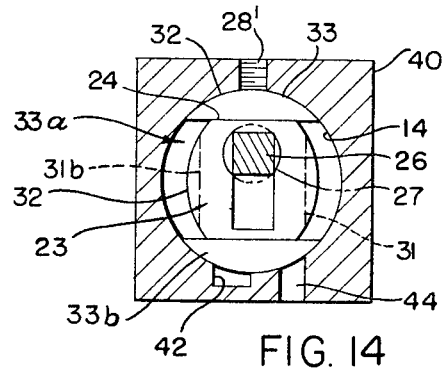

More specifically, the operation of the engine illustrated in FIG. 8 is as follows: Assuming the piston 23 to be in the top dead center position illustrated in FIG. 10, the piston 36 is in bottom dead center position and a fresh charge of air and fuel is being transferred through the passage 42 to the space beneath the piston 23. Simultaneously charge of air and fuel is being transferred through the exhaust port 44. At the same time, a fresh charge of fuel is being received through the inlet port 41 into the space above the secondary piston 36. As the fuel is ignited with the engine in the position shown in FIG. 10, the gases expand as described in connection with the engine of FIG. 1, with the piston 23 moving to an eccentric position as shown in FIGS. 12 and 14 thereby transmitting torque to the shaft 27.

Figure 13:
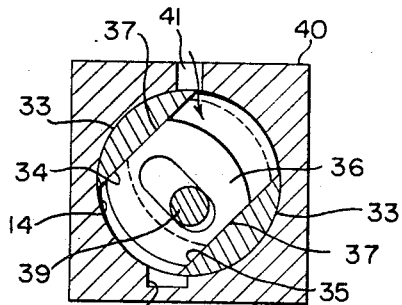
Figure 15:
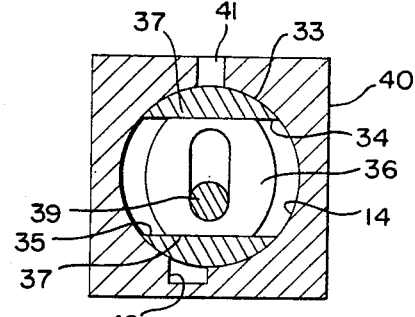
Figure 17:
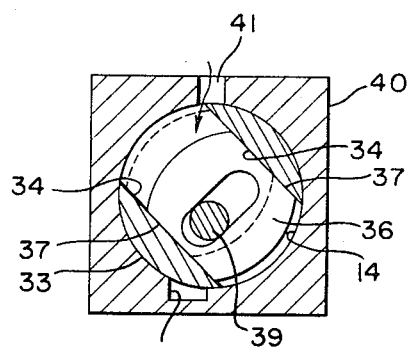
Figure 16:
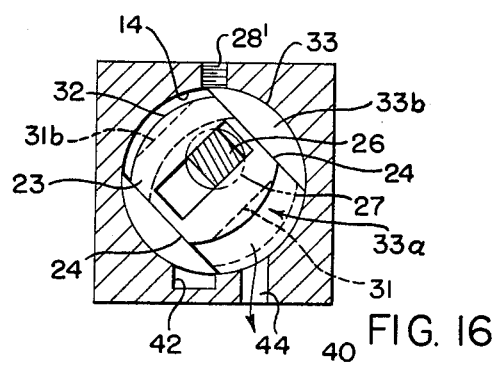
Figure 27:
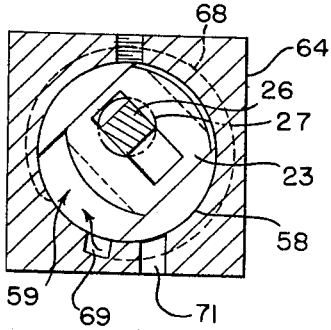
Figure 28:
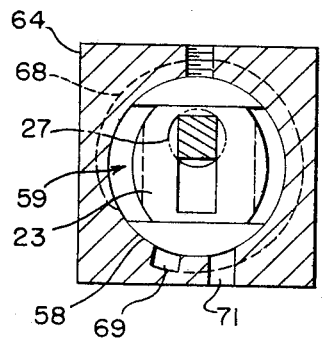
Figure 29:
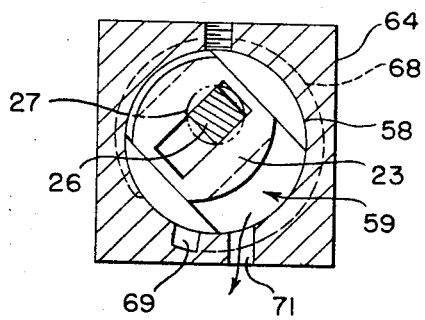

The shifting of the piston as the gases expand and the consequent rotation of the cylinder 33 causes a corresponding shift in position of the secondary piston 36, as shown in FIGS. 13 and 15. As the secondary piston 36 is shifted to an eccentric position relative to the stub shaft 39, the fuel and air which has been received through inlet port 41 is compressed. The valving of the intake port 41 is accomplished by the side wall of the slot 35 in a manner similar to that described in connection with the valving in the embodiment of FIG. 1. As the cylinder rotates to a position slightly past that illustrated in FIG. 17, the wall of the slot 35 uncovers the passage 42 so that the compressed charge of fuel and air is expelled into the passage under pressure and is thereby transferred to the power side of the cylinder. The pressurized charge assists in the scavenging of the combustion residue in the combustion chamber after which the fresh charge is compressed and ignited in the manner described in connection with the embodiment of FIG. 1.

A further modification wherein a compressed charge of fuel and air is delivered to the combustion chamber is illustrated in FIG. 18. Here again, like reference numerals are used to indicate like parts, with the shaft 27 and end plate 13 being substantially identical to the embodiments of FIG. 1 and FIG. 8. The piston 23' is of a modified design in that the lower surface of the piston, as viewed in FIG. 18, does not include the recess 31. In addition, the rectangular recess 25' no longer bisects the piston but rather it is predominantly in the lower half of the piston. The cylinder 45 in the embodiment of FIG. 18 includes a slot 46 in which the piston 23' is received in a manner similar to the previous two embodiments. However, the slot does not extend over the entire diameter of the cylinder face, but rather, terminates in a bottom wall 47 which is of arcuate configuration corresponding to the arcuate surface 32' on the piston 23'. The wall 47 is associated with the lower half of the piston so that the combination of the wall and the lower half of the piston equal in dimension the upper half of the piston.

The housing 48 includes an exhaust port 49 generally in alignment with the path of rotation of the slot 46 and piston 23' with the flow of gases through the exhaust port being controlled by the walls of the slot 46 in the manner described above. An inlet or induction port 50 is provided in the end wall 51.

Formed in the back slot wall 52 of the cylinder 45 is an induction port generally indicated at 53. The port 53 is defined by arcuate end walls 54a, b and side walls 55, 56. One end wall 54a coincides with the arcuate surfaces 32' and 47 on the piston 23' and cylinder 45 respectively and one side wall 55 coincides with one wall of slot 46. The side 56 opposite to the side 55 of the port 53 includes an arcuate recess 57 which is formed on a radius substantially identical to the radius of the inlet port 50.

The port 53 serves as a transfer passage for the gases to proceed from the inlet port 50 to the combustion chamber in slot 46. Thus, as viewed in FIG. 20, with cylinder 45 in a position wherein the recess 57 is aligned with the port 50, the fuel and air mixture flows in through the port 50, behind the piston 23, and into the space below the piston 23'. As the cylinder 45 rotates to successive positions, however, the port 53 becomes misaligned with the inlet port thereby effectively closing the inlet port and preventing further flow of the mixture until a fresh charge is required. With the port 53 in a position wherein further flow of fuel and air is discontinued, the piston 23', as it proceeds on its power stroke due to the expansion of the ignited gases, compresses the mixture as shown in FIG. 21. It is to be noted that in the configuration of the engine illustrated in FIG. 18, as distinguished from the previously described engines, as the piston 23 assumes a position of top dead center after rotation of the cylinder 45 through 180°, the fresh charge of gas and air is forced through an exposed portion of the port 53 to the underside of the piston 23' as shown in FIG. 22. To permit this transfer of the compressed fresh charge, it is important that the length of the port 53 is dimensioned so that it exceeds the dimensions of the piston and is, therefore, never fully covered thereby. Simultaneously with this transfer, the combustion residue is being exhausted through the exhaust port 59 so that the inrush of the fresh charge under the compression of the piston assists in the scavenging of the combustion chamber. Continued rotation of the cylinder 45 causes the piston to compress the fresh charge in the manner described above and a new power stroke is effected.

It is to be noted in connection with the embodiment of FIG. 18 that but a single power stroke is obtained per revolution of the shaft 27 as opposed to the two power strokes which are obtainable with the designs of FIGS. 1 and 8. However, the embodiment of FIG. 18 does include the basic features of the other embodiments including an enhanced scavenging and charge transfer system.

Turning now to the embodiment shown in FIG. 24, once again like reference numerals are used to indicate like parts, with the shaft 27, the piston 23 and the end plate 13 being identical to that which is illustrated in the embodiment of FIG. 1. A modified cylinder 58 is used with the cylinder including a slot 59 which is identical to the slots in the embodiments of FIG. 1 and FIG. 8. However, on the face of the cylinder opposite to that in which the slot 59 is formed, there is provided a plurality of angularly spaced, radially extending vanes 60 which converge inwardly on a stub shaft 61. The shaft 61 is received in a bore 63 in the end plate 62 and mounts the cylinder 58 for rotation in the housing 64. The bore 63 includes a reduced diameter bore 65 which serves as an inlet port, which port communicates and is coaxially aligned with a passage 66 in the stub shaft 61. Radial ports 67 are formed in the shaft 61 and provide communication between the passage 66 and the radial vanes 60.

Formed in the peripheral wall in the bore through housing 64 is a discontinuous circumferential passage 68 which, with the rotor assembled in the housing 64, is in alignment with the vanes 60. At one end of the circumferential passage, there is formed an axial passage 69 which provides a path spanning the wall 70 separating the slot 59 from the vanes 60. An exhaust port 71 is formed in the housing in the manner of the exhaust ports previously described.

Operation of the embodiment of FIG. 24 is substantially similar to that described in connection with the embodiment of FIG. 8, with the exception that instead of an additional piston as was used in the case of the embodiment in FIG. 8, the radial vanes 60 serve as an impeller to compress the fresh charge prior to the scavenging of the combustion chamber. Aside from the different type of compressing means utilized in the two embodiments, the operation of the device of FIG. 24 is identical to that described in connection with FIG. 8 and a further description is believed to be unnecessary.

It is apparent that the objects set forth have been fully accomplished by the various embodiments described herein. It is contemplated that many changes will suggest themselves to those having ordinary skill in the art so the particular means described are not meant to be limiting. For example, it is contemplated that a plurality of cylinders, each using the principles herein disclosed, may be incorporated in a single engine. Also, techniques such as fuel injection may also be adapted to the engines here described in which case the inlet port would be used solely as a source of air. Changes such as these, to enumerate but a few, are contemplated by the principles of this invention so that although for ease of description, the principles of the invention have been set forth in connection with but a few illustrated embodiments, it is not intended that these embodiments or the terminology employed in describing them is to be limiting, but rather, it is my desire to be restricted only by the scope of the appended claims.

I claim:

1. A rotary piston mechanism comprising:
a housing;
a cylinder rotatably mounted in a bore in said housing;
said cylinder including an open slot formed in one end face thereof;
a piston slidably received in said slot and including means restraining rotation of said piston relative to said cylinder;
a shaft rotatably carried by said housing with the rotational axis thereof being displaced from the rotational axis of said cylinder; and
means operatively connecting said shaft to said piston for rotation therewith and thereby connecting said shaft for rotation with said cylinder.

2. The mechanism of claim 1 and further including a plurality of ports formed in said housing and opening into said bore.

3. The mechanism of claim 2 wherein at least a portion of each of said ports is aligned with the path of rotation of the open slot in said cylinder whereby upon rotation of said cylinder the slot is periodically in communication with the ports.

4. A rotary piston mechanism comprising:
a housing having a central bore therein;
a cylinder rotatably received in said bore;
said cylinder including a slot formed in one end face thereof, with the slot extending transverse to the rotational axis of said cylinder;
said slot being defined by spaced apart parallel side walls and a bottom wall;
a piston slidably received in said slot and being restrained from rotation relative to said cylinder;
a shaft having an axis of rotation parallel to but displaced from the axis of rotation of said cylinder;
means operatively connecting one end of said shaft to said piston for rotation therewith;
a plurality of ports formed in said housing and opening into said central bore;
at least a portion of each of said ports being aligned with the path of rotation of said slot in said cylinder whereby upon rotation of said cylinder, said side walls of said slot alternately cover and uncover said portion of said ports.

5. A rotary piston engine comprising:
a housing having a bore therein;
a cylinder rotatably received in said bore;
said cylinder including an open slot formed in one end face thereof;
a piston slidably received in said slot;
said piston including means cooperating with said slot restraining relative rotation of said piston and said cylinder;
and a shaft parallel to said bore operatively connected to said piston for rotation therewith.

6. A rotary piston engine comprising:
a housing;
a central bore in said housing;
a cylinder rotatably mounted in said central bore;
a slot formed in said cylinder;
a shaft rotatably mounted in said housing with the rotational axis of said shaft displaced from the rotational axis of said cylinder;
a piston in said slot in said cylinder and being restrained from rotation relative thereto;
means interconnecting said shaft with said piston for unitary rotation;
said means including a pin on said shaft and a recess in said piston adapted to receive said pin whereby said piston may move relative to said shaft.

7. A rotary piston engine comprising:
a housing having a central bore therein;
a cylinder rotatably received in said bore;
said cylinder including an open slot formed in one end face thereof;
a piston disposed in said slot;
said piston cooperating with the walls of said slot thereby preventing relative rotation of said piston and said cylinder;
a shaft rotatably carried by said housing;
means connecting said shaft to said piston including a pin carried by said shaft projecting into a recess in said piston;
said pin and recess cooperating to prevent relative rotation between said piston and shaft but permitting said piston to assume a position eccentric to said shaft; and
inlet and exhaust ports in said housing communicating with said cylinder slot.

8. The combination of claim 7 and further including pump means operatively associated with said inlet port and being adapted to receive and compress a fresh charge of fluid whereby the charge is delivered to said slot under pressure.

9. The combination of claim 8 wherein said pump means includes a slot formed in the other end face of said cylinder;
a secondary piston received in said latter slot;
a shaft carried by said housing;
said secondary piston including a recess therein receiving said shaft for rotation therearound;

the dimensions of said recess being such as to permit said pumping piston to assume a position eccentric to the axis of said shaft.

10. The combination of claim 8 wherein said pump means includes a plurality of vanes carried by said cylinder, and transfer passage means in said housing interconnecting the path of rotation of said vanes with the path of rotation of said slot.

11. The combination of claim 8 wherein said pump means comprises a bottom wall in said slot;

an aperture in said cylinder extending axially thereof and opening into said slot, adjacent one corner of the bottom wall thereof;

said inlet port opening into said central bore adjacent the other end of said cylinder and being offset from the axis of rotation of said cylinder whereby said port and said aperture are in alignment during a portion of the rotation of said cylinder.

12. A rotary piston engine comprising;

a housing having a central bore therein;

an inlet port and an exhaust port formed in said housing and communicating with said central bore;

a cylinder rotatably received in said central bore;

said cylinder including a slot having spaced apart parallel walls formed in one end face thereof;

a piston received in said slot;

said piston including means cooperating with said walls of said slot restraining said piston from rotation relative to said cylinder;

a shaft having an axis of rotation parallel to but displaced from the axis of rotation of said cylinder;

pin means carried on one end of said shaft;

an elongated recess formed in said piston with said pin means being received therein;

said pin means including means thereon cooperating with said recess whereby said piston and said shaft are interconnected for rotation but said piston is free to shift transversely of said shaft.

13. The engine of claim 12 wherein said ports are aligned with the path of rotation of said slot in said cylinder.

14. The engine of claim 12 wherein said exhaust port is aligned with the path of rotation of said slot in said cylinder;

said inlet port being adjacent the other end of said cylinder;

and means interconnecting said inlet port with said slot in said one end face of said cylinder.

15. The engine of claim 14 wherein said interconnecting means comprises a transfer passage in said housing;

and pump means associated with said cylinder in communication with said transfer passage and said inlet port.

16. A rotary piston engine comprising;

a housing formed with a cylindrical chamber therein;

a cylindrical member having a close running fit with the side and end walls of the chamber and being rotatable about its central axis;

a transversely extending slot formed in one end face of said cylindrical member;

circumferentially spaced inlet and exhaust ports leading to the chamber and being in the path of rotation of said slot whereby said slot is in successive communication with said ports as said cylinder is rotating;

a piston reciprocally mounted in said transversely extending slot;

a shaft rotatably supported in said housing for rotation about an axis eccentric to the axis of rotation of said cylinder;

means nonrotatably connecting said piston to one end of said shaft for sliding movement transverse to the rotating axis of said shaft;

and ignition means in said housing circumferentially spaced from said ports and being in the path of rotation of said piston and said slot in said cylinder whereby a combustible mixture inducted through the inlet port and compressed by said piston is ignited to drive said shaft.

References Cited by the Examiner

UNITED STATES PATENTS

| 46,672 | 3/1865 | Huston | 91—202 |
| 1,184,651 | 5/1916 | Johnston | 123—44 |
| 1,495,611 | 5/1924 | Parrouffe | 91—202 |

FOREIGN PATENTS

| 1,275,080 | 9/1961 | France. |
| 314,677 | 10/1919 | Germany. |
| 640,936 | 1/1937 | Germany. |

MARK NEWMAN, *Primary Examiner.*

W. E. BURNS, *Assistant Examiner.*